(12) United States Patent
Chen

(10) Patent No.: US 12,378,783 B2
(45) Date of Patent: Aug. 5, 2025

(54) WORKING SYSTEM

(71) Applicant: Hangzhou Fuya Science and Technology Co. Ltd., Zhejiang (CN)

(72) Inventor: Ningning Chen, Zhejiang (CN)

(73) Assignee: HANGZHOU FUYA SCIENCE AND TECHNOLOGY CO. LTD., Zhejiang (CN)

( * ) Notice: Subject to any disclaimer, the term of this patent is extended or adjusted under 35 U.S.C. 154(b) by 425 days.

(21) Appl. No.: 16/907,066

(22) Filed: Jun. 19, 2020

(65) Prior Publication Data

US 2020/0399911 A1    Dec. 24, 2020

(30) Foreign Application Priority Data

Jun. 20, 2019 (CN) .......................... 201910539510.9

(51) Int. Cl.
| | | |
|---|---|---|
| *E04G 3/32* | (2006.01) | |
| *E04G 3/28* | (2006.01) | |
| *E04G 3/34* | (2006.01) | |

(52) U.S. Cl.
CPC .................. *E04G 3/32* (2013.01); *E04G 3/34* (2013.01); *E04G 2003/283* (2013.01); *E04G 2003/286* (2013.01)

(58) Field of Classification Search
CPC ... E04G 3/32; E04G 2003/283; E04G 23/002; E04G 3/34; E04G 2003/286; A47L 3/04; B08B 3/024; B62D 57/024; B66F 11/04; B66F 17/006
See application file for complete search history.

(56) References Cited

U.S. PATENT DOCUMENTS

| | | | | |
|---|---|---|---|---|
| 1,947,286 A | * | 2/1934 | Bitterbaum | E04G 23/002 451/354 |
| 3,220,509 A | * | 11/1965 | Fisher | E04G 3/243 182/47 |
| 3,344,454 A | * | 10/1967 | Mikalson | A47L 1/02 15/50.3 |
| 3,641,607 A | * | 2/1972 | Lemelson | A47L 11/4011 15/103 |
| 3,863,393 A | * | 2/1975 | Goff | B24C 3/062 212/346 |
| 4,074,789 A | * | 2/1978 | Warren | E04G 3/34 182/14 |
| 4,355,699 A | * | 10/1982 | Smith, Jr. | A62B 1/02 182/12 |
| 4,717,029 A | * | 1/1988 | Yasunobu | B66C 13/063 212/270 |
| 4,809,383 A | * | 3/1989 | Urakami | B63B 59/10 15/385 |

(Continued)

*Primary Examiner* — Brian D Mattei
*Assistant Examiner* — Kathleen M. McFarland
(74) *Attorney, Agent, or Firm* — McCoy Russell LLP

(57) ABSTRACT

The present invention relates to a working system, including at least one fastened rope node, at least one mobile rope node, and at least one suspended rope node. The three nodes are connected by using a rope, the fastened rope node is fastened to a surface of a building, the suspended rope node includes at least one working apparatus, and the working apparatus works on a side facade of the building. The mobile rope node can move on the building and change a suspension position of the suspended rope node. In the present invention, safety of a facade working robot is improved, and a working scope is expanded.

21 Claims, 10 Drawing Sheets

(56) References Cited

U.S. PATENT DOCUMENTS

| | | | | |
|---|---|---|---|---|
| 4,926,957 A | * | 5/1990 | Urakami | E04G 23/002 180/164 |
| 5,240,503 A | * | 8/1993 | Levy | E04G 23/002 451/92 |
| 5,343,979 A | * | 9/1994 | Goto | E04G 3/32 182/147 |
| 5,716,261 A | * | 2/1998 | Watkin | B63B 59/06 451/92 |
| 5,901,720 A | * | 5/1999 | Lange | B63B 59/00 134/172 |
| 6,666,299 B2 | * | 12/2003 | Cole | E04G 3/30 182/150 |
| 6,691,811 B2 | * | 2/2004 | Bruntrup | B62D 57/024 180/164 |
| 6,964,312 B2 | * | 11/2005 | Maggio | B62D 57/00 15/340.1 |
| 7,665,173 B2 | * | 2/2010 | Simonette | E04G 23/002 15/103 |
| 7,666,262 B2 | * | 2/2010 | Brown | B08B 1/008 134/6 |
| 7,775,312 B2 | * | 8/2010 | Maggio | B62D 49/0635 15/340.1 |
| 7,972,446 B2 | * | 7/2011 | Lange | A47L 11/4066 15/103 |
| 8,298,347 B2 | * | 10/2012 | MacNeil | F23J 3/023 134/198 |
| 8,695,192 B2 | * | 4/2014 | Mann | B08B 3/024 29/281.6 |
| 8,790,468 B2 | * | 7/2014 | Simonette | E04G 23/002 15/103 |
| 10,238,899 B1 | * | 3/2019 | Sherman | A62B 35/0075 |
| 10,550,591 B2 | * | 2/2020 | Lange | A47L 11/4088 |
| 10,655,345 B2 | * | 5/2020 | Seow | E04G 3/34 |
| 10,829,171 B2 | * | 11/2020 | Parrott | B62D 57/024 |
| 10,858,104 B2 | * | 12/2020 | Maghsoodi | B66D 1/54 |
| 10,919,589 B1 | * | 2/2021 | Maggio | B62D 55/265 |
| 11,298,830 B2 | * | 4/2022 | Wang | B08B 13/00 |
| 2003/0099922 A1 | * | 5/2003 | Kassai | G09B 19/00 434/236 |
| 2003/0159884 A1 | * | 8/2003 | Cole | E04G 3/30 182/145 |
| 2006/0048800 A1 | * | 3/2006 | Rast | B08B 3/04 134/172 |
| 2009/0044833 A1 | * | 2/2009 | Simonette | E04G 23/002 15/103 |
| 2020/0399911 A1 | * | 12/2020 | Chen | E04G 23/002 |
| 2021/0040757 A1 | * | 2/2021 | Abadi | E04G 3/28 |
| 2021/0155344 A1 | * | 5/2021 | Mura Yañez | B64D 1/18 |
| 2021/0198910 A1 | * | 7/2021 | Lange | E04G 3/325 |
| 2021/0253187 A1 | * | 8/2021 | Li | B25J 5/00 |
| 2021/0276641 A1 | * | 9/2021 | Beard, III | B62D 55/265 |
| 2021/0353118 A1 | * | 11/2021 | Urakami | B08B 1/005 |
| 2021/0380186 A1 | * | 12/2021 | Zhu | B62D 57/024 |
| 2021/0394841 A1 | * | 12/2021 | Chintalapalli Patta | B60L 50/66 |
| 2021/0408963 A1 | * | 12/2021 | Dorsch | B08B 1/008 |
| 2022/0042332 A1 | * | 2/2022 | Chen | B05B 15/68 |
| 2022/0094301 A1 | * | 3/2022 | Li | B66D 3/00 |
| 2022/0120377 A1 | * | 4/2022 | Kim | B08B 3/04 |
| 2022/0177060 A1 | * | 6/2022 | Kikuchi | B62D 57/024 |
| 2022/0185631 A1 | * | 6/2022 | Lanz | E04G 3/32 |

* cited by examiner

WORKING SYSTEM

CROSS-REFERENCE TO RELATED APPLICATION

The present application claims priority to Chinese Patent Application No. 201910539510.9, entitled "WORKING SYSTEM", and filed on Jun. 20, 2019. The entire contents of the above-listed application is hereby incorporated by reference for all purposes.

TECHNICAL FIELD

The present invention relates to the field of wall-climbing robot application technologies, and in particular, to a working system.

BACKGROUND

A facade working robot is a robot that can beat gravity to carry out construction work on a facade. Most existing facade working robots are directly adsorbed on facades of buildings by using adsorption apparatuses to move, and can carry working tools and carry out work. The buildings can be edifices, large oil tanks, large ships, or the like. Such a facade working robot has the following disadvantages:

(1) The robot falls down when the robot is faulty (for example, an adsorption mechanism fails), resulting in very serious consequences (the robot falls down and damages ground facilities). Therefore, such a robot poses a great potential safety risk.

(2) The robot relies on the friction on a work surface to balance its own gravity, work counterforce, gravity of a working tool, and the like. Therefore, such a robot has a very limited load-bearing capacity and work capacity. In addition, a working height is limited.

A structure of another facade working robot is shown in FIG. 1. Two rope coiling apparatuses B are installed and fastened on a top surface F of a building A, and ropes C of the rope coiling apparatuses B are connected to a working apparatus D. The two rope coiling apparatuses B change a position of the working apparatus D on a working facade E (namely, a side facade of the building A) by controlling lengths of the two ropes C. The two ropes C apply tension to the working apparatus D, which balances gravity of the working apparatus D and a working tool installed on the working apparatus D. Therefore, such a solution can resolve the foregoing two problems, but brings new problems. There is a very large angle θ between the ropes when there is a very short vertical distance G between the working apparatus D and the rope coiling apparatuses B. In this case, to balance the gravity of the working apparatus D, the two ropes C need to apply great tension. Theoretically, to make the working apparatus D reach the top of the working facade E (in other words, the vertical distance G to the rope coiling apparatuses B is 0), the angle θ between the ropes needs to be very close to 180 degrees, and in this case, the two ropes C need to apply infinite tension to produce sufficient force to balance the gravity of the working apparatus D. Clearly, both the tension and power that can be produced by the rope coiling apparatuses B are limited. Consequently, the working apparatus D cannot reach an upper area of the working facade E near the rope coiling apparatuses B.

SUMMARY

To resolve a technical problem, the present invention provides a working system, to effectively avoid a potential safety risk that a working apparatus falls from a facade and to expand a working height and a working scope.

The present invention is implemented as follows: A working system is provided and includes: at least one fastened rope node, at least one mobile rope node, and at least one suspended rope node, where all of the fastened rope node, the mobile rope node, and the suspended rope node are respectively connected by using ropes, the mobile rope node is disposed between the fastened rope node and the suspended rope node, a rope connected to the mobile rope node has a variable length, the fastened rope node is fastened to a building, the suspended rope node is in the state of suspension by gravity, the suspended rope node includes at least one working apparatus, the working apparatus can carry out specified work, the mobile rope node includes a node body and a mobile mechanism, the mobile mechanism is disposed on the node body, the mobile rope node can move on the building, and plays a role of changing a suspension position of the suspended rope node, the mobile rope node is in contact with the building and produces acting force, and the acting force can balance rope tension applied to the mobile rope node.

Further, one fastened rope node, one mobile rope node, and one suspended rope node are included, the fastened rope node is fastened to the building, and a rope between the fastened rope node and the mobile rope node and a rope between the mobile rope node and the suspended rope node have a variable length.

Further, the fastened rope node is a rope coiling apparatus, the rope coiling apparatus can tighten and loosen a rope, and the rope is connected to the suspended rope node after passing through the node body of the mobile rope node.

Further, the fastened rope node includes a rope fastening block fixedly connected to the building, the node body includes a first rope coiling apparatus and a second rope coiling apparatus, the rope fastening block is connected to the first rope coiling apparatus by using a first rope, the first rope coiling apparatus changes the length of the first rope by tightening and loosening the first rope, the second rope coiling apparatus is connected to the suspended rope node by using a second rope, and the second rope coiling apparatus changes the length of the second rope by tightening and loosening the second rope.

Further, the fastened rope node includes a first rope coiling apparatus fixedly connected to the building, the node body includes a second rope coiling apparatus, the first rope coiling apparatus is connected to the mobile rope node by using a first rope, the first rope coiling apparatus changes the length of the first rope by tightening and loosening the first rope, the second rope coiling apparatus is connected to the suspended rope node by using a second rope, and the second rope coiling apparatus changes the length of the second rope by tightening and loosening the second rope.

Further, two or more fastened rope nodes are included, and all of the fastened rope nodes are connected in series by using a rope to change a path and a direction of the rope.

Further, the two or more fastened rope nodes include a rope coiling apparatus and at least one pulley, the rope connected to the rope coiling apparatus is connected to the mobile rope node after sequentially passing through the pulley, and the pulley changes the path and the direction of the rope.

Further, two or more fastened rope nodes are included, all of the fastened rope nodes are connected to the mobile rope node by using ropes, and components, in a moving direction of the mobile rope node, of tension applied by the ropes to the mobile rope node cancel each other out.

Further, the mobile rope node further includes a rope guide mechanism, the ropes of the two or more fastened rope nodes are connected to the rope guide mechanism, the rope guide mechanism is connected to the node body by using a rope, and a direction of the rope between the rope guide mechanism and the node body is changed by changing the length of the rope between the fastened rope node and the rope guide mechanism.

Further, the fastened rope nodes include a first rope coiling apparatus and a second rope coiling apparatus, the rope guide mechanism includes a pulley and a support for supporting the pulley, the pulley is installed on the pulley support, a rope of the first rope coiling apparatus is connected to the node body after passing through the pulley, a rope of the second rope coiling apparatus is connected to the pulley support, and the direction of the rope between the rope guide mechanism and the node body is changed by tightening and loosening the rope of the first rope coiling apparatus and/or the rope of the second rope coiling apparatus.

Further, a rope direction detection mechanism is further disposed on the node body to detect a swinging direction of the rope between the node body and the rope guide mechanism.

Further, the rope direction detection mechanism includes a rope linkage rod and an angle sensor, and the angle sensor detects an angle change of the rope linkage rod.

Further, one of the ropes that connect the two or more fastened rope nodes to the mobile rope node is connected to the suspended rope node after passing through the mobile rope node.

Further, the mobile rope node includes a mobile node adsorption mechanism, and the mobile node adsorption mechanism can apply adsorption force to the building.

Further, the suspended rope node includes a suspended adsorption mechanism, and the suspended adsorption mechanism is adsorbed on a surface of the building.

Further, the mobile rope node is of an L-shaped structure, is in contact with multiple surfaces of the building, and produces acting force on the multiple surfaces.

Further, the mobile rope node is of a H-shaped structure, envelopes the building, is in contact with multiple surfaces of the building, and produces acting force.

Further, a mobile working mechanism is disposed on the working apparatus, the mobile working mechanism enables the working apparatus to move on a surface of the building on which the working apparatus works, and the mobile working mechanism is provided with wheels.

Further, an obstacle-overcoming sled is disposed at ends of the working apparatus, and the obstacle-overcoming sled is provided with an inclined outwardly extending shape or an arc shape.

Further, the suspended rope node includes two or more working apparatuses, two adjacent working apparatuses are flexibly connected, and the flexible connection is a rope connection.

Compared with that in the prior technology, the working system in the present invention includes the fastened rope node, the mobile rope node, and the suspended rope node that are successively connected to each other by using ropes, the fastened rope node is fastened to the surface of the building, and the working apparatus is disposed on the suspended rope node. The mobile mechanism and the adsorption mechanism are respectively disposed on the mobile rope node and the suspended rope node, to increase adsorption capabilities of the mobile rope node and the suspended rope node while increasing a working scope of the working apparatus. Therefore, a potential safety risk that the working apparatus falls from a facade during working is effectively avoided, thereby improving safety.

DESCRIPTION OF EMBODIMENTS

To make the technical problems to be resolved in the present invention, technical solutions, and beneficial effects clearer, the following further describes the present invention in detail with reference to the accompanying drawings and embodiments. It should be understood that the specific embodiments described herein are merely intended to explain the present invention, and are not intended to limit the present invention.

Embodiment 1

Figure 1:
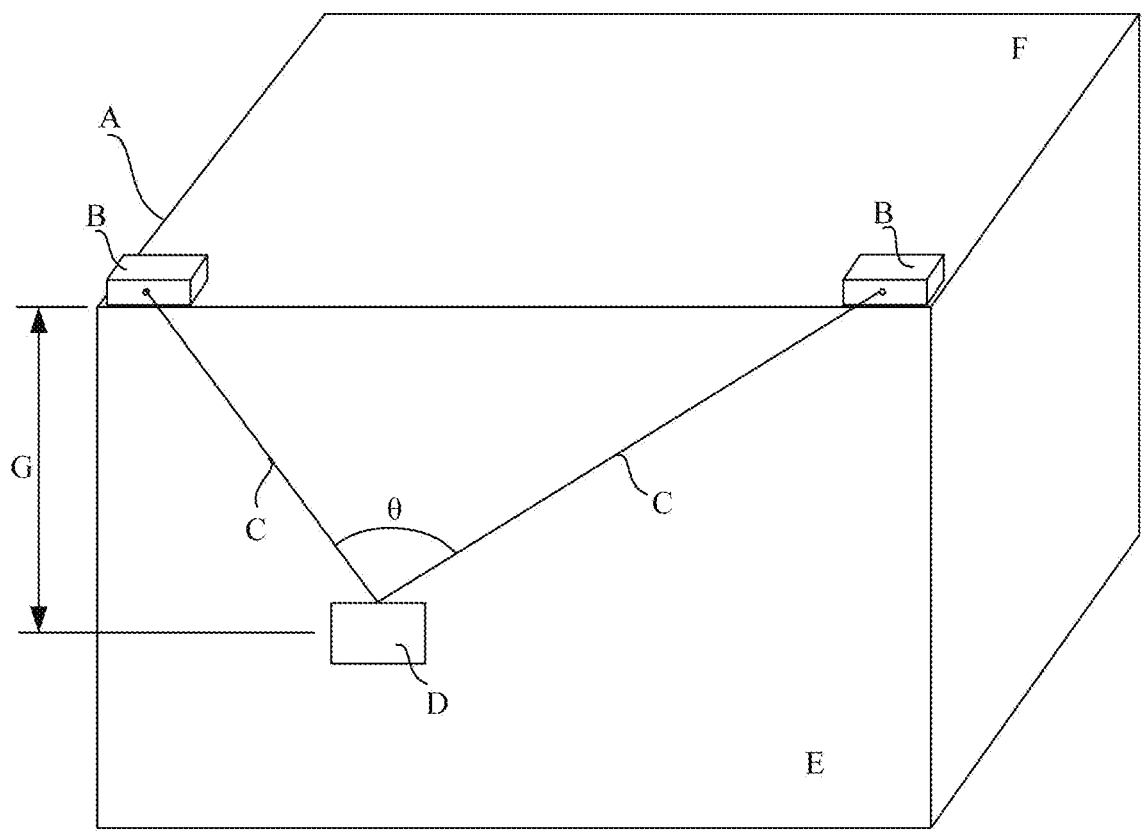
FIG. 1 is a schematic structural diagram of a facade working robot in the prior technology.
Figure 2A:
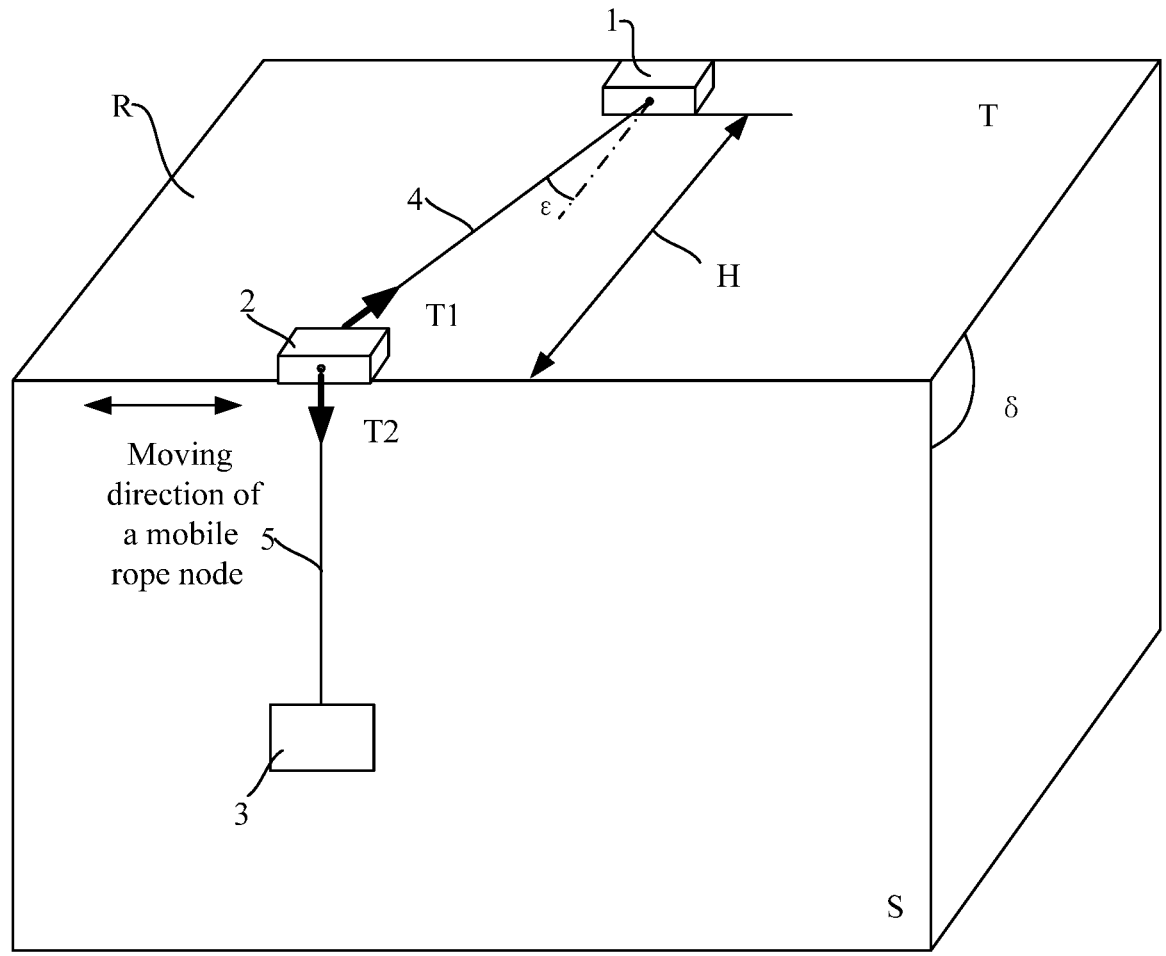
FIG. 2A is a schematic structural diagram of a preferred embodiment of a working system in the present invention.

As shown in FIG. 2A, a building R is an edifice, and a side facade S of the building R is a working facade. A system that includes multiple rope nodes is built on the building R. A fastened rope node 1 is fastened to a top surface T of the building R. A mobile rope node 2 can move on the top surface T. A suspended rope node 3 is located on the side facade S, and is in the state of suspension by gravity. The fastened rope node 1 is connected to the mobile rope node 2 by using a first rope 4, and the mobile rope node 2 is connected to the suspended rope node 3 by using a second rope 5. The second rope 5 is tightened by gravity of the suspended rope node 3. The first rope 4 is also tightened because of force transmission. The first rope 4 and the second rope 5 have a variable length. The second rope 5 provides tension for the suspended rope node 3 to balance the gravity.

Figure 2B:
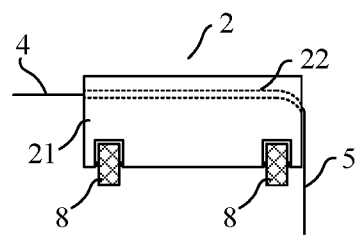
FIG. 2B is an enlarged schematic diagram of an embodiment of a mobile rope node in FIG. 2A.
Figure 2C:
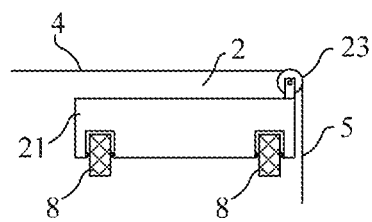
FIG. 2C is an enlarged schematic diagram of another embodiment of a mobile rope node in FIG. 2A.

Specifically, in this embodiment, the fastened rope node 1 is a rope coiling apparatus that can tighten and loosen the first rope 4, and the rope coiling apparatus is fastened to the top surface T of the building R. The mobile rope node 2 includes a node body 21 and a mobile mechanism. The mobile mechanism is disposed on the node body 21. The mobile mechanism can be wheeled or legged, and is not specified herein. The suspended rope node 3 is a working apparatus that can carry out specific work, for example, cleaning and painting, on the side facade S of the building R. In FIG. 2B, the mobile mechanism is wheels 8, and the first rope 4 is pulled out of the rope coiling apparatus, and passes through a wiring trough 22 of the node body 21. FIG. 2C shows another solution. The node body 21 includes one pulley 23, and the first rope 4 is pulled out of the rope coiling apparatus and passes by the pulley 23. An end of the second rope 5 is connected to the working apparatus. In other words, the first rope 4 and the second rope 5 in the figure are two segments of the same rope. The mobile rope node 2 functions as a suspension fulcrum for the suspended rope node. As the mobile rope node moves, a position of the suspension fulcrum changes accordingly. The length of the first rope 4 changes as the mobile rope node 2 moves. The length of the second rope 5 can be adjusted by tightening and loosening the rope by the rope coiling apparatus, so that the working apparatus can move and work on the facade.

Next, a force condition of the mobile rope node 2 is analyzed. The mobile rope node 2 is subject to the gravity and also to tension T1 of the first rope 4 and tension T2 of the second rope 5. In addition, the contact between the mobile rope node 2 and the building R produces acting force. The mobile rope node 2 can move normally and stably functions as the suspension fulcrum only when the acting force balances the tension of the ropes and the gravity. Therefore, an important function of the mobile rope node 2 is to be in contact with the building R and produce acting force to balance the tension of the ropes and the gravity, so that the mobile rope node 2 is in a force balanced state. There are diversified structures for implementing this function. The structures cannot be exhaustively illustrated in this specification, and only the following examples are provided.

Figure 3A:
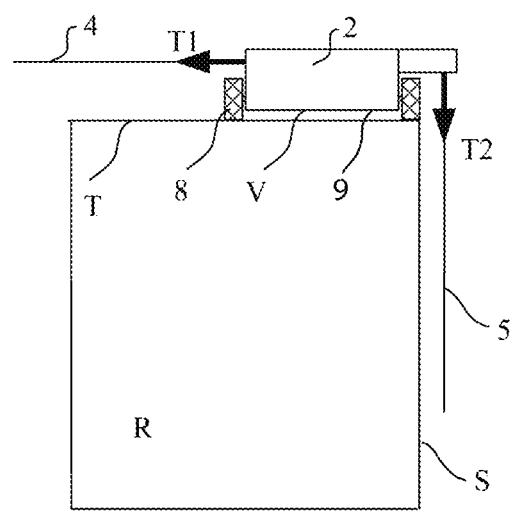
FIG. 3A is a schematic diagram of force analysis of a mobile rope node in FIG. 2 on a top surface of a building.

(1) As shown in FIG. 2 and FIG. 3A, the building R has the top surface T and the side facade S. The mobile rope node 2 is placed on the top surface T, and moves by driving wheels of the mobile mechanism 8 disposed on the mobile rope node 2. The mobile rope node 2 is subject to the tension T1 of the first rope 4, the tension T2 of the second rope 5, and the gravity. Under the action of the tension T2 and the gravity of the mobile rope node 2, there is compression force between the mobile rope node 2 and the top surface T. The compression force acts on the wheels, and produces friction. The compression force and the friction are acting force applied by the building R to the mobile rope node 2. The compression force balances the tension T2 and the gravity of the mobile rope node 2, and the friction balances the tension T1. The compression force between the mobile rope node 2 and the top surface T can be increased by increasing the weight of the mobile rope node 2, to obtain enough friction, so that the friction is sufficient to balance the tension T1. In addition, an angle δ between the top surface T and the side facade S is not limited to 90 degrees, as shown in FIG. 2. The angle δ can be any angle provided that the mobile rope node 2 can reach the force balanced state.

Figure 3B:
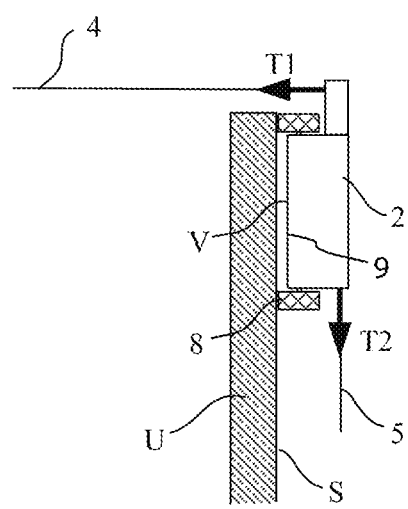
FIG. 3B is a schematic diagram of force analysis of a mobile rope node in FIG. 2 on a side facade of a building.

(2) As shown in FIG. 3B, there is a narrow wall U on the building R. The mobile rope node 2 is placed on the side facade S. The tension T2 is applied to the mobile rope node 2 to produce compression force with the side facade S. The compression force acts on wheels of the mobile mechanism 8 of the mobile rope node 2, and produces friction. The friction balances the tension T1 and the gravity of the mobile rope node 2.

Figure 3C:
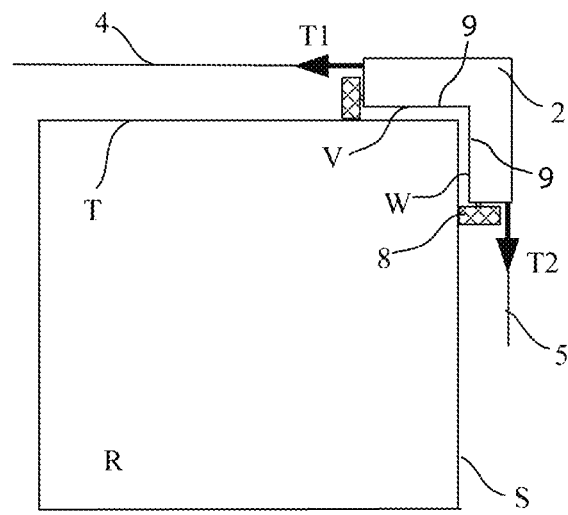
FIG. 3C is a schematic diagram of force analysis of a mobile rope node in FIG. 2 on a top surface and a side facade of a building.

(3) As shown in FIG. 3C, the mobile rope node 2 is of an L-shaped structure. A wheel on one side of the mobile rope node 2 presses against the top surface T of the building R, and a wheel on the other side of the mobile rope node 2 is in contact with the side facade S. The top surface T and the side facade S respectively apply acting force to the wheels. Compression force in the acting force can balance most of rope tension, and friction in the acting force needs to balance only a small part of the rope tension. Therefore, the mobile rope node 2 in FIG. 3C can be in a more stable and safer force bearing state than that in FIG. 3B.

Figure 3D:
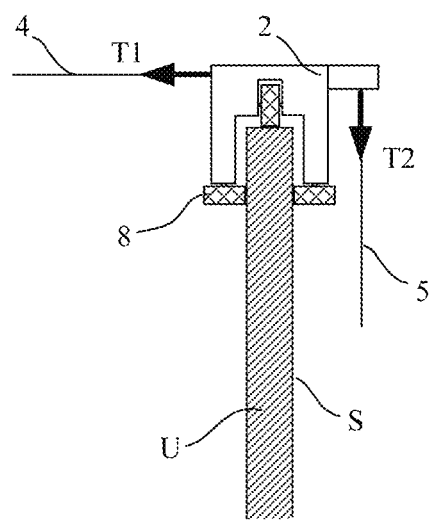
FIG. 3D is a schematic diagram of force analysis of a mobile rope node in FIG. 2 on a narrow wall of a building.

(4) As shown in FIG. 3D, there is a narrow wall U on the building R. The mobile rope node 2 is of a H-shaped structure. The mobile rope node 2 envelopes the narrow wall U. Wheels of the mobile mechanism 8 are in contact with multiple surfaces of the narrow wall U. Therefore, regardless of changes of the rope tension, the mobile rope node 2 does not fall from the narrow wall U, and there is acting force between the mobile rope node 2 and the narrow wall U.

Therefore, the solutions shown in FIG. 2, FIG. 3A, FIG. 3B, FIG. 3C, and FIG. 3D have the following advantages:

(1) The rope of the rope coiling apparatus fastened to the building R is connected to the mobile rope node 2 and the working apparatus, so that all the apparatuses do not fall down.

(2) The mobile rope node 2 moves left and right, and the rope coiling apparatus enables the working apparatus to move up and down by tightening and loosening the rope. Therefore, the working apparatus can cover the entire side facade S.

(3) The resultant force of the tension T1 and the tension T2 is directed to the building R, and does not produce a force moment that causes the mobile rope node 2 to overturn. Therefore, the mobile rope node 2 moves on the building R without a track, which omits auxiliary work such as laying a track on the building R.

Figure 4A:
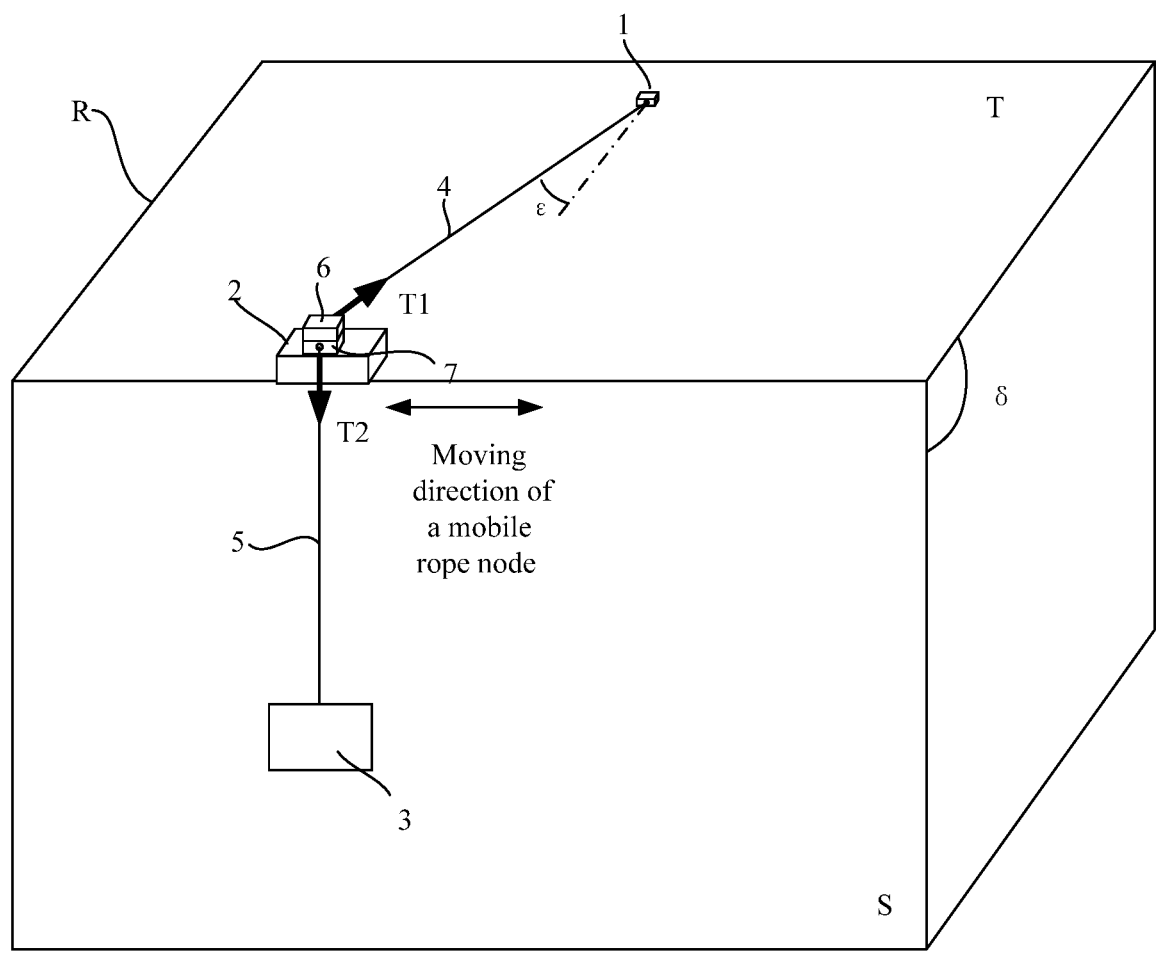
FIG. 4A is a schematic structural diagram of a second embodiment of a mobile rope node in a working system in the present invention.
Figure 4B:
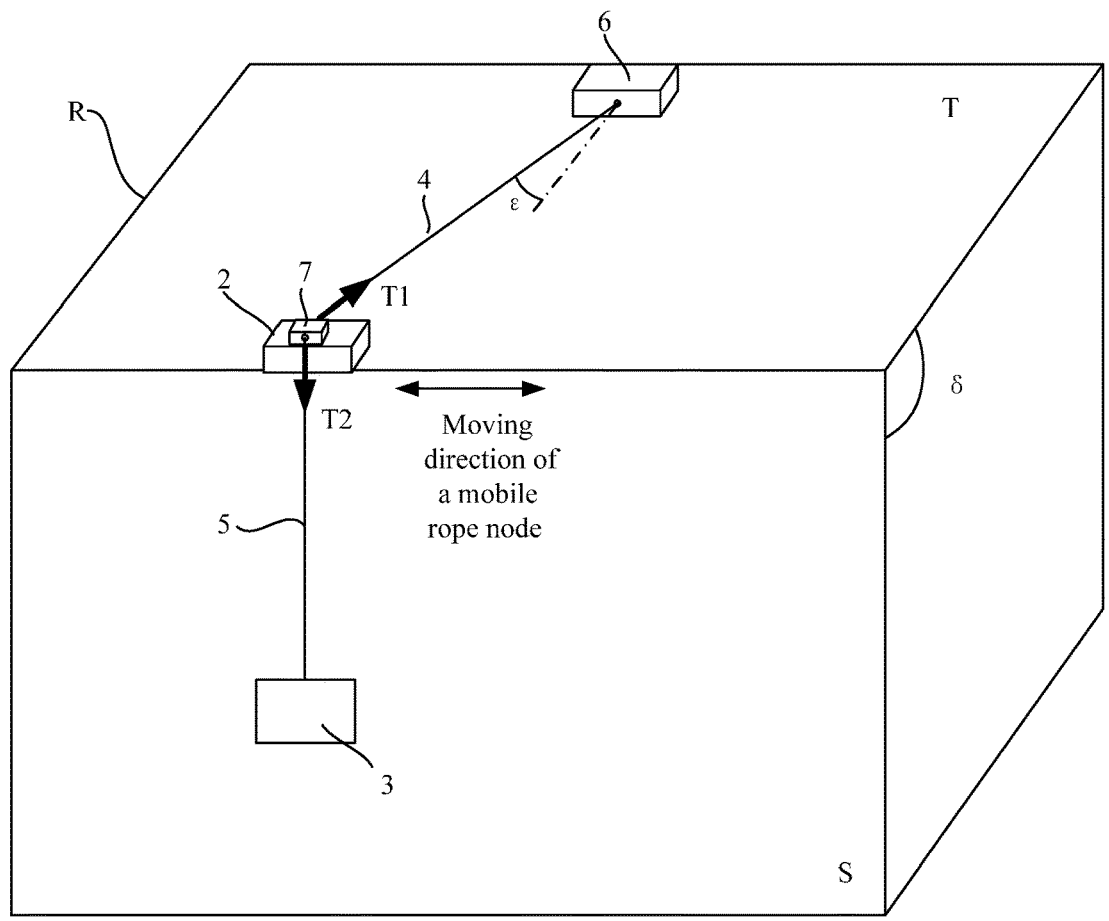
FIG. 4B is a schematic structural diagram of another embodiment of mobile rope node in FIG. 4A.

Referring to FIG. 2, FIG. 4A, and FIG. 4B, it should be further noted that: in the foregoing embodiment, the first rope 4 and the second rope 5 are two segments of the same rope; but the two segments of the rope can be alternatively separated. As shown in FIG. 4A, in another embodiment of the mobile rope node in the working system in the present invention, the fastened rope node 1 is a rope fastening block that is fixedly connected to the building R. The mobile rope node 2 includes a mobile mechanism 8 (not shown) and a node body 21. The node body 21 includes a first rope coiling apparatus 6 and a second rope coiling apparatus 7. A first rope 4 of the first rope coiling apparatus 6 is connected to the rope fastening block, and the first rope coiling apparatus 6 changes the length of the first rope 4 by tightening and loosening the first rope 4. A second rope 5 of the second rope coiling apparatus 7 is connected to the suspended rope node 3, and the second rope coiling apparatus 7 changes the length of the second rope 5 by tightening and loosening the second rope 5. Alternatively, as shown in FIG. 4b, the fastened rope node 1 includes a first rope coiling apparatus 6 fixedly connected to the building R, the node body 21 includes a second rope coiling apparatus 7, the first rope coiling apparatus 6 is connected to the mobile rope node 2 by using a first rope 4, and the first rope coiling apparatus 6 changes the length of the first rope 4 by tightening and loosening the first rope 4. The second rope coiling apparatus 7 is connected to the suspended rope node 3 by using a second rope 5, and the second rope coiling apparatus 7 changes the length of the second rope 5 by tightening and loosening the second rope 5.

There are many other methods for changing the lengths of the first rope 4 and the second rope 5. Examples are not listed one by one herein.

Embodiment 2

Based on Embodiment 1, the mobile rope node 2 includes a mobile node adsorption mechanism 9. The mobile node adsorption mechanism 9 is installed on the node body 21. The mobile node adsorption mechanism 9 can use vacuum to produce adsorption force. When the top surface T is made of magnetic materials, a magnetic adsorption mechanism can be used to produce adsorption force. There can be a non-contact adsorption method or a contact adsorption method. A principle, an installation method, and an installation position of the mobile node adsorption mechanism are not specified herein. The mobile node adsorption mechanism 9 applies adsorption force to the mobile rope node 2, to increase acting force between the mobile rope node 2 and the building R.

In the various embodiments in FIG. 3A, FIG. 3B, FIG. 3C, and FIG. 3D, the mobile node adsorption mechanism 9 is added to the mobile rope node 2 to be adsorbed on the surface of the building R and to increase acting force (including compression force and friction) between the wheels of the mobile mechanism 8 of the mobile rope node 2 and the surfaces of the building R, so that the mobile rope node 2 is in a better force balanced state. An adsorption surface of the mobile node adsorption mechanism 9 can be set to a surface V in FIG. 3A and FIG. 3B. In FIG. 3C, the adsorption surface of the mobile node adsorption mechanism 9 can be set to a surface V or a surface W, or the adsorption surface of the mobile node adsorption mechanism 9 can be set to both a surface V and a surface W.

Embodiment 3

Figure 5:
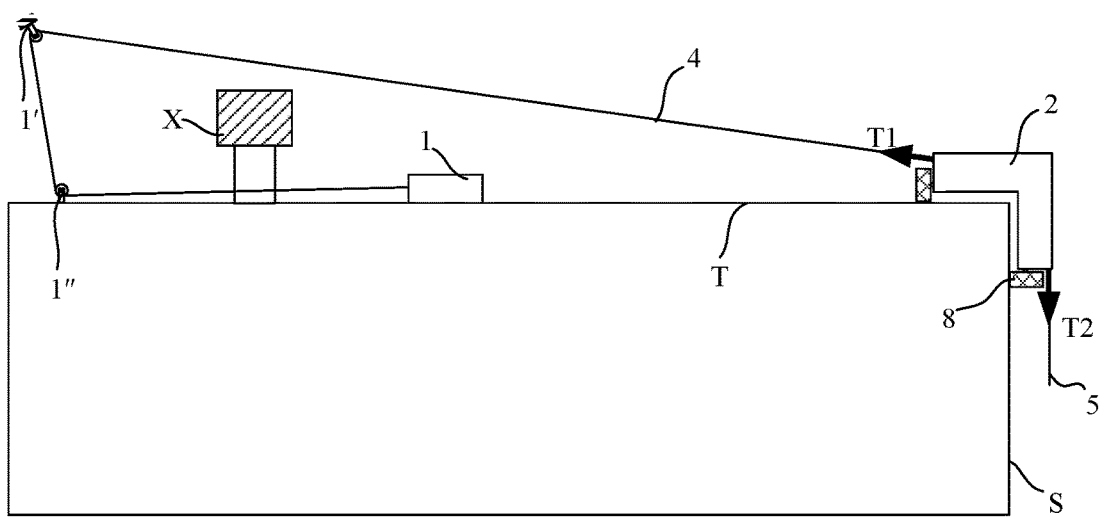
FIG. 5 is a schematic structural diagram of adding one fastened rope node (a pulley) to a working system in FIG. 2.

As shown in FIG. 2 and FIG. 5, both the top surface T and the side facade S of the building R apply acting force to the wheels of the mobile rope node 2. Compression force in the acting force can balance most of rope tension, and friction in the acting force needs to balance only a small part of the rope tension (for example, a component of the tension T1 in a moving direction of the mobile rope node 2). However, the angle c in FIG. 2 increases as the mobile rope node 2 moves laterally. In this case, the component of the tension T1 in the moving direction of the mobile rope node 2 also increases. If the friction between the mobile rope node 2 and the surface of the building R is less than the component, the mobile rope node 2 cannot continue to move, and consequently a lateral movement range of the apparatus is limited.

The problem can be resolved by adding a fastened rope node. The tension of the rope connected to the mobile rope node has components in the moving direction of the mobile rope node. The fastened rope node is added to change magnitudes and directions of these components, thereby weakening impact of these components on movement of the mobile rope node. The following provides further description by using three specific solutions.

(1) As shown in FIG. 2, a movement range of the mobile rope node 2 can be increased by increasing a linear distance H between the fastened rope node 1 and the mobile rope node 2. With the same lateral movement distance, a longer linear distance H indicates a smaller angle and a smaller lateral component of the tension T1, which is favorable to expansion of the lateral movement range. A vertical distance can be increased by installing and fastening the rope coiling apparatus of the fastened rope node 1 at a further distance. However, the rope coiling apparatus is heavy, and therefore is difficult to carry and install. Therefore, as shown in FIG. 5, two fastened rope nodes 1' and 1" are added. The two fastened rope nodes are two pulleys. The pulley is small and light, has a more flexible installation and fastening method, and can be easily installed on and fastened to a structure such as a steel frame, a water pipe, a flag pole, or a handrail on the building R. The three fastened rope nodes are connected in series by using a rope, to be specific, the rope of the rope coiling apparatus passes by the two pulleys to reach the mobile rope node 2. The pulleys change a path and a direction of the rope. In this case, an obstacle X on the top surface of the building can be avoided, and the linear distance H between the fastened rope node and the mobile rope node 2 can be increased. Therefore, the lateral movement range of the mobile rope node 2 can be increased. The fastened rope nodes 1' and 1" can be replaced with other parts such as rope rings.

Figure 6:
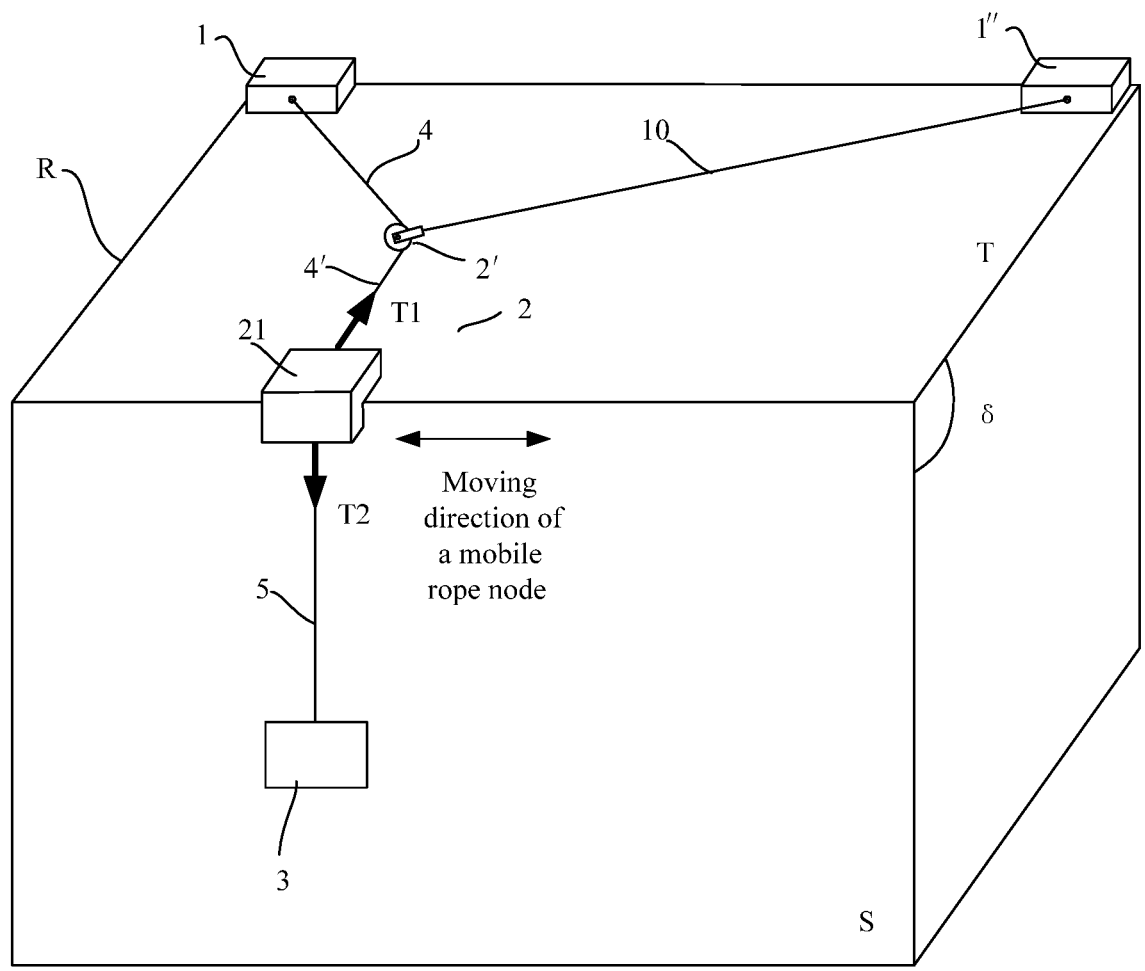
FIG. 6 is a schematic structural diagram of adding one fastened rope node and one mobile rope node to a working system in FIG. 2.

(2) Refer to FIG. 2 and FIG. 6. Compared with FIG. 2, in FIG. 6, one fastened rope node 1" is added, and a rope guide mechanism 2' is added to the mobile rope node 2. The rope guide mechanism 2' is connected to the node body 21 by using a rope 4'. The fastened rope node 1" is also a rope coiling apparatus. The rope guide mechanism 2' includes a pulley and a pulley support, and the pulley is installed on the pulley support. The fastened rope node 1" is connected to the pulley support by using a third rope 10. The first rope 4 passes through the pulley to reach the node body 21, in other words, the rope 4' between the rope guide mechanism 2' and the node body 21 is a part of the first rope 4. Lengths of the first rope 4 and the third rope 10 are changed by tightening and loosening a rope of the fastened rope node 1", to change a position of the rope guide mechanism 2' and change an angle at which the rope 4' enters the node body 21. Clearly, when the rope 4' is perpendicular to a moving direction of the node body 21, tension T1 of the rope 4' has no component in the moving direction. Therefore, the node body 21 moves without being affected by the component of the tension in the moving direction.

Figure 7:
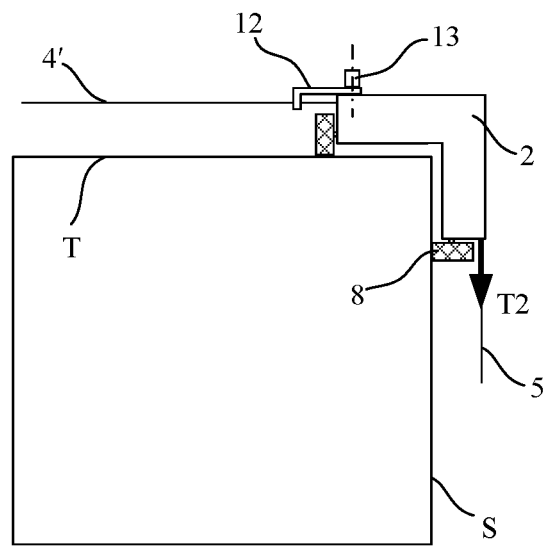
FIG. 7 is a schematic structural diagram of disposing a rope direction detection mechanism on a mobile rope node in FIG. 6.

Referring to FIG. 6 and FIG. 7, a rope direction detection mechanism is added to the node body 21. The rope direction detection mechanism is configured to detect a relative angle between the rope 4' and the node body 21. Then, a single-chip microcomputer of a control system controls, based on the relative angle, the fastened rope node 1" to tighten and loosen the third rope 10, to ensure that the rope 4' is perpendicular to the moving direction of the node body 21. A specific implementation method is to install a rope linkage rod 12 on the node body 21. The rope linkage rod 12 can rotate about an axis, there is a small hole at a front end, and the rope 4' passes through the small hole. The rope linkage rod 12 swings with the rope 4'. A swinging angle of the rope linkage rod 12 is detected by using an angle sensor 13.

Figure 8:
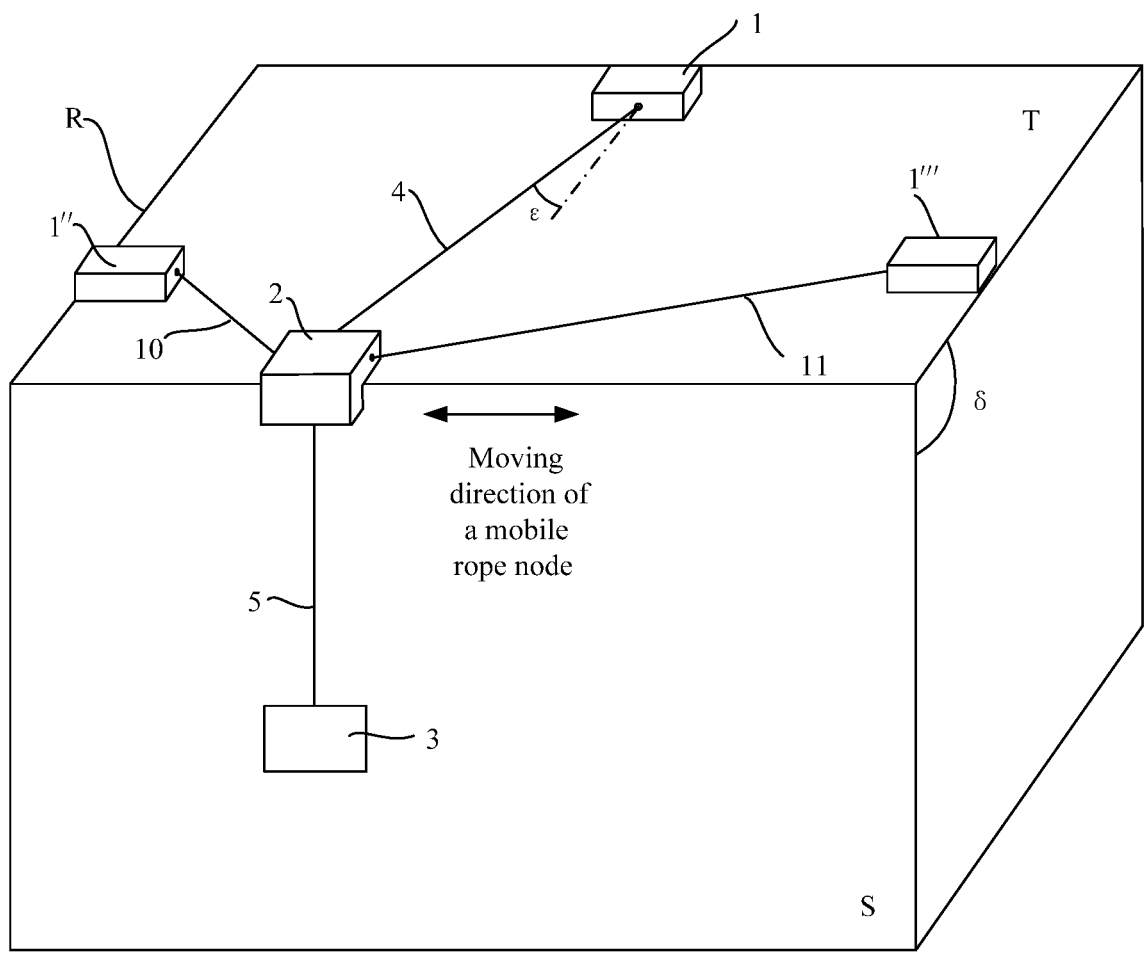
FIG. 8 is a schematic structural diagram of adding two fastened rope nodes to a working system in FIG. 2.

(3) As shown in FIG. 8, two fastened rope nodes 1" and 1' are added based on FIG. 2 to obtain the technical solution in FIG. 8. The two fastened rope nodes are two rope coiling apparatuses, are fixedly connected to the building R, and are connected to the mobile rope node 2 by respectively using a third rope 10 and a fourth rope 11. As the mobile rope node 2 moves, the three rope coiling apparatuses collaboratively tighten and loosen ropes, so that the three ropes are of appropriate lengths. Components, in the moving direction of the mobile rope node, of tension applied by the three ropes to the mobile rope node 2 vary in direction. The state shown in FIG. 8 is used as an example. A direction of the component of 1" is leftward, and directions of the components of 1 and 1' are rightward. In this case, the three components can cancel each other out. Therefore, the mobile rope node 2 can always be in the force balanced state when moving laterally. It can be learned that the objective of disposing multiple fastened rope nodes is to make rope tension of the fastened rope nodes produce components varying in direction in the moving direction of the mobile rope node 2, so that the components cancel each other out. In addition, the second rope 5 that connects the mobile rope node 2 to the suspended rope node 3 can be an extension of any one of the first rope 4, the third rope 10, and the fourth rope 11. For example, the third rope 10 and the second rope 5 can be ropes of the rope coiling apparatus 1", so that the rope coiling apparatus 1" can change lengths of the third rope 10 and the second rope 5 by tightening and loosening the ropes.

Figure 9:
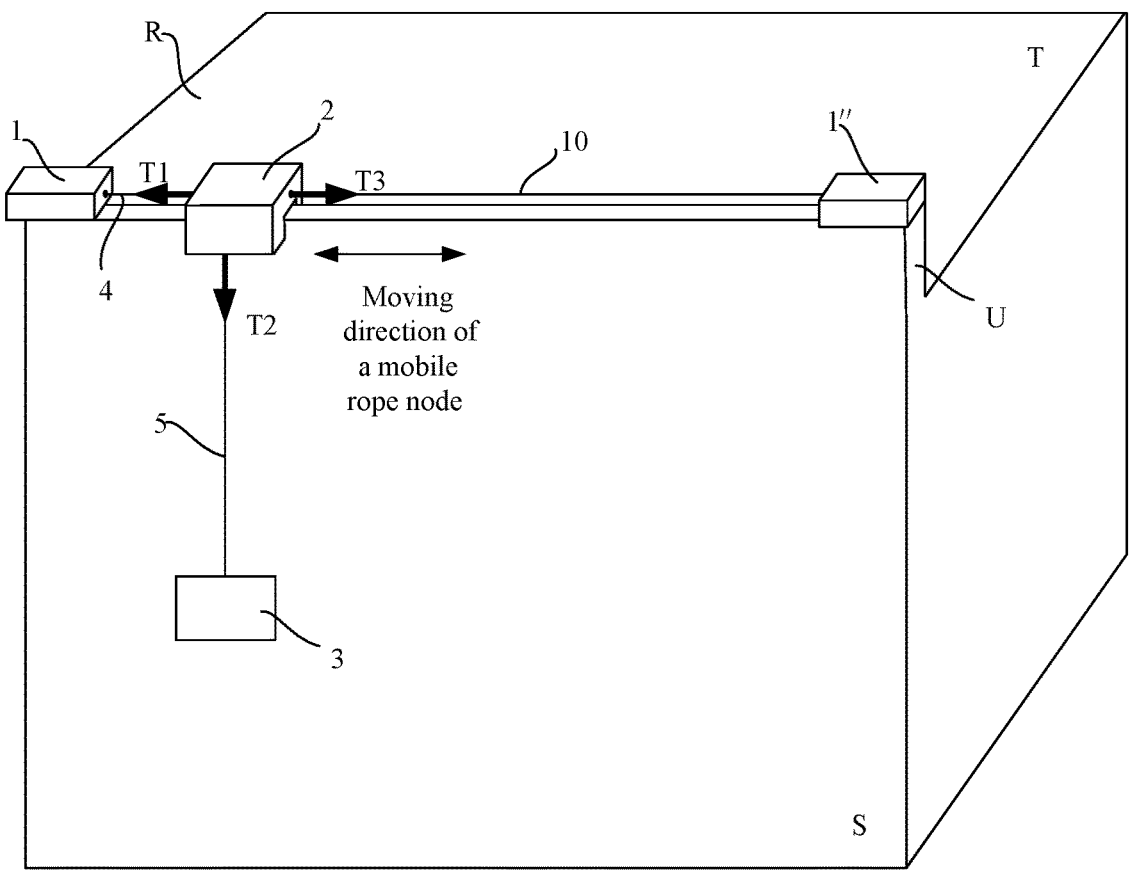
FIG. 9 is a schematic structural diagram of disposing all of two fastened rope nodes and one mobile rope node in a working system in the present invention on a narrow wall.

(4) As shown in FIG. 9, there is a narrow wall U on the building R in FIG. 9. The fastened rope node 1 and the mobile rope node 2 are disposed on the narrow wall U, and a fastened rope node 1" is further added to the other side of the mobile rope node 2. The mobile rope node 2 uses the H-shaped structure in FIG. 3d, and is in contact with multiple surfaces of the narrow wall U. The first rope 4 of the rope coiling apparatus of the fastened rope node 1 is connected to the working apparatus of the suspended rope node 3 after passing through the mobile rope node 2. In other words, the first rope 4 and the second rope 5 are two segments of the same rope. The rope coiling apparatus of the fastened rope node 1 can change the lengths of the first rope 4 and the second rope 5 by tightening and loosening the ropes. A rope coiling apparatus of the fastened rope node 1" is connected to the mobile rope node 2 by using a third rope 10. The rope coiling apparatus of the fastened rope node 1" can change the length of the third rope 10 by tightening and loosening the rope. The tension T2 is balanced by acting force between the mobile rope node 2 and the narrow wall U. The tension T1 of the first rope 4 is balanced by tension T3 of the third rope 10. Therefore, the mobile rope node 2 is in the force balanced state. A lateral position of the mobile rope node 2 on the narrow wall U can be changed by tightening and loosening the third rope 10 by the rope coiling apparatus of the fastened rope node 1". The rope coiling apparatuses 1 and 1" are located on both sides of the mobile rope node. Therefore, components, in the moving direction of the mobile rope node, of the tension T1 of the first rope 4 and the tension T3 of the third rope 10 vary in direction, and cancel each other out, so that the mobile rope node 2 can be in a better force balanced state.

Embodiment 4

In Embodiment 1, the suspended rope node 3 includes a working apparatus, and the working apparatus can implement specific functions such as cleaning and painting. Counterforce is produced when the working apparatus works on the side facade S. The counterforce pushes the working apparatus away, and shakes the working apparatus. In addition, the working apparatus is easy to be affected by the crosswind at high altitude and swing, resulting in a potential safety risk. To resolve these problems, a working adsorption mechanism (not shown in the figure) is installed on the working apparatus of the suspended rope node 3. A function of the working adsorption mechanism is to stabilize the suspended rope node and increase a working capacity of the working apparatus by adsorbing on the facade of the building. The working adsorption mechanism can use vacuum to produce adsorption force. When the facade of the building is made of magnetic materials, a magnetic adsorption mechanism can be used to produce adsorption force. There can be a non-contact adsorption method or a contact adsorption method. A principle, an installation method, and an installation position of the working adsorption mechanism are not specified herein. The working adsorption mechanism applies adsorption force to the working apparatus, to increase the working capacity of the working apparatus and improve high altitude stability of the working apparatus.

Embodiment 5

Figure 10:
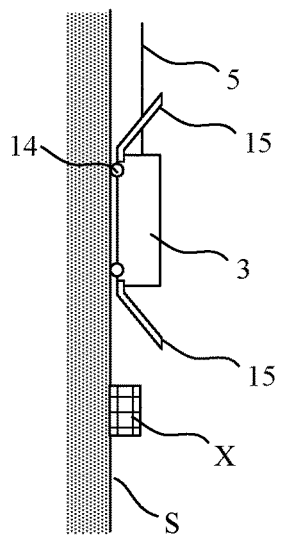
FIG. 10 is a schematic diagram of overcoming an obstacle by a suspended rope node in a working system in FIG. 2.

As shown in FIG. 10, a mobile working mechanism 14 is disposed on the working apparatus of the suspended rope node 3. The mobile working mechanism 14 enables the working apparatus to move on the side facade S of the building on which the working apparatus works. The mobile working mechanism 14 is provided with wheels driven without power. As the second rope 5 is tightened and loosened, the wheels of the working apparatus roll on the working side facade S, and the working apparatus moves up and down. When there is a protruding obstacle X on the side facade S, the working apparatus cannot overcome the obstacle X. To improve an obstacle-overcoming capability, as shown in FIG. 10, an obstacle-overcoming sled 15 is installed at ends of the working apparatus. The obstacle-overcoming sled 15 is provided with an inclined outwardly extending shape or an arc shape, and a height of an outermost end of the inclined surface or the arc shape of the obstacle-overcoming sled 15 is greater than a height of the obstacle X. When the obstacle-overcoming sled 15 encounters the obstacle X, the obstacle-overcoming sled 15 lifts the working apparatus to overcome the obstacle X.

Embodiment 6

Figure 11:
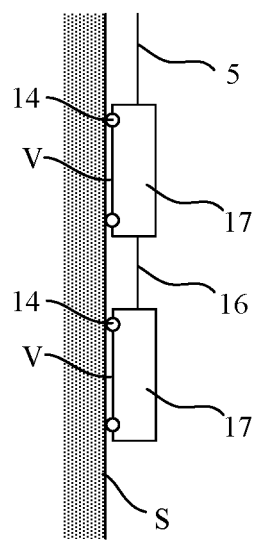
FIG. 11 is a schematic structural diagram of disposing two working apparatuses on a suspended rope node in a working system in FIG. 2.

As shown in FIG. 11, when the working apparatus on which the working adsorption mechanism is installed is adsorbed on the side facade S to move and work, if the working adsorption mechanism fails, for example, if the working apparatus on which a magnetic adsorption mechanism is installed moves to an area of the working facade that is made of non-magnetic materials, the working apparatus shakes under the action of the crosswind at high altitude. A longer rope causes a larger shaking amplitude. In this case, even if the working apparatus moves to an area made of absorbable magnetic materials again, it is difficult for the working apparatus to adsorb on the working side facade S again due to drastic shaking. Therefore, the solution in FIG. 11 is designed. The suspended rope node 3 includes two or more working apparatuses 17. A working adsorption mechanism and a mobile working mechanism 14 are disposed on each working apparatus 17. An adsorption surface V of the working adsorption mechanism faces the side facade S. Adjacent working apparatuses 17 are flexibly connected. For example, the flexible connection is a rope connection, and there is a connection rope 16 between the adjacent working apparatuses 17. When working adsorption mechanisms of some working apparatuses 17 fail, working adsorption mechanisms of the other working apparatuses 17 can still be adsorbed on the side facade S, which acts as a fulcrum. Shaking of the working apparatuses 17 whose working adsorption mechanisms fail is constrained by using the connection rope 16. Therefore, the failed working adsorption mechanisms can be adsorbed on the side facade S again if an adsorption condition permits. Stability of the working apparatus 17 on the side facade S is ensured in this solution. For example, as shown in FIG. 11, a working adsorption mechanism of an upper working apparatus 17 fails for some reason. However, a working adsorption mechanism of a lower working apparatus 17 is adsorbed on the side facade S. Therefore, the upper working apparatus 17 does not swing and shake under the constraint of the connection rope 16, and the failed working adsorption mechanism can be adsorbed on the side facade S again if the adsorption condition is satisfied again.

Embodiment 7

Figure 12:
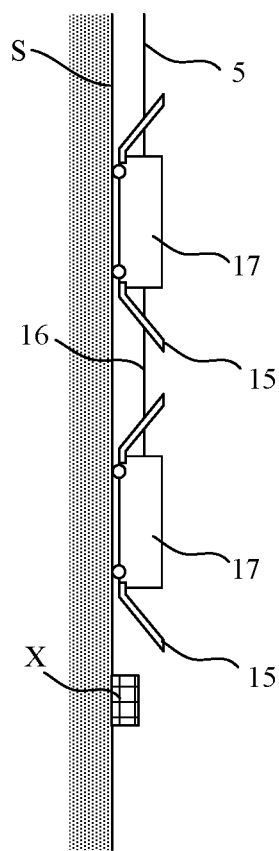
FIG. 12 is a schematic diagram of overcoming an obstacle by two working apparatuses on a suspended rope node in FIG. 11.

As shown in FIG. 12, based on Embodiment 5, the suspended rope node 3 includes two or more working apparatuses 17, and an obstacle-overcoming sled 15 is installed at ends of each working apparatus 17. For example, when the suspended rope node 3 moves downward, a lower working apparatus 17 first overcomes the protruding obstacle X. The lower working apparatus 17 is far away from the side facade S when overcoming the obstacle X, which causes a working adsorption mechanism of the working apparatus 17 to fail. However, an upper working apparatus 17 remains adsorbed on the side facade S, and therefore the lower working apparatus 17 does not shake drastically under the constraint of a connection rope 16. The lower working apparatus 17 can be adsorbed on the side facade S again after overcoming the obstacle X. As the suspended rope node 3 continues to move downward, the upper working apparatus 17 overcomes the obstacle X, and adsorption of the lower working apparatus 17 ensures that the upper working apparatus 17 does not shake drastically, thereby maintaining system stability of the working apparatuses 17 of the entire suspended rope node 3.

The foregoing descriptions are merely preferred embodiments of the present invention, and are not intended to limit the present invention. Any modification, equivalent replacement, and improvement made within the spirit and principle of the present invention shall fall within the protection scope of the present invention.

The invention claimed is:

1. A working system, comprising at least one fastened rope node, one mobile rope node, and at least one suspended rope node, wherein all of the fastened rope node(s), the mobile rope node, and the suspended rope node(s) are respectively connected by using ropes, the mobile rope node is disposed between the fastened rope node(s) and the suspended rope node(s), a rope connecting the mobile rope node and the fastened rope node(s) has a variable length, the fastened rope node(s) is fixedly fastened to a building and does not move on the building, the suspended rope node(s) is in the state of suspension by gravity, the suspended rope node(s) comprises at least one working apparatus, the working apparatus can carry out specified work, the mobile rope node comprises a node body and a mobile mechanism, the mobile mechanism is disposed on the node body, the mobile rope node is moveable laterally in a left and a right direction across a top surface of the building so as to change a suspension position of the suspended rope node with respect to the top surface, the mobile rope node is in contact with the building and produces acting force, and the acting force can balance rope tension applied to the mobile rope node.

2. The working system according to claim 1, comprising one fastened rope node, one mobile rope node, and one suspended rope node, wherein the fastened rope node is fixedly fastened to the building, and a rope between the mobile rope node and the suspended rope node has a variable length.

3. The working system according to claim 2, wherein the fastened rope node is a rope coiling apparatus, the rope coiling apparatus can tighten and loosen a rope, and the rope is connected to the suspended rope node after passing through the node body of the mobile rope node.

4. The working system according to claim 2, wherein the fastened rope node comprises a rope fastening block fixedly connected to the building, the node body of the mobile rope node comprises a first rope coiling apparatus and a second rope coiling apparatus, the rope fastening block is connected to the first rope coiling apparatus by using a first rope, the first rope coiling apparatus changes a length of the first rope by tightening and loosening the first rope, the second rope coiling apparatus is connected to the suspended rope node by using a second rope, and the second rope coiling apparatus changes a length of the second rope by tightening and loosening the second rope.

5. The working system according to claim 2, wherein the fastened rope node comprises a first rope coiling apparatus fixedly connected to the building, the mobile rope node comprises a second rope coiling apparatus, the first rope coiling apparatus is connected to the mobile rope node by using a first rope, the first rope coiling apparatus changes a length of the first rope by tightening and loosening the first rope, the second rope coiling apparatus is connected to the suspended rope node by using a second rope, and the second rope coiling apparatus changes a length of the second rope by tightening and loosening the second rope.

6. The working system according to claim 1, wherein the two or more fastened rope nodes comprise a rope coiling apparatus and at least one pulley, the rope connected to the rope coiling apparatus is connected to the mobile rope node after sequentially passing through the pulley(s), and the pulley(s) changes the path and the direction of the rope.

7. The working system according to claim 1, wherein the at least one fastened rope node comprises two or more fastened rope nodes, and wherein all of the fastened rope nodes are separately connected to the mobile rope node by using ropes, and components, in a moving direction of the mobile rope node, of tension applied by the ropes to the mobile rope node cancel each other out.

8. The working system according to claim 7, wherein the mobile rope node further comprises a rope guide mechanism, the ropes of the two or more fastened rope nodes are connected to the rope guide mechanism, the rope guide mechanism is connected to the node body by using a rope, and a direction of the rope between the rope guide mechanism and the node body is changed with a length of the rope between the fastened rope node and the rope guide mechanism.

9. The working system according to claim 8, wherein the fastened rope nodes comprise a first rope coiling apparatus and a second rope coiling apparatus, the rope guide mechanism comprises a pulley and a support for supporting the pulley, the pulley is installed on the pulley support, a rope of the first rope coiling apparatus is connected to the node body after passing through the pulley, a rope of the second rope coiling apparatus is connected to the pulley support, and a direction of a rope between the rope guide mechanism and the node body is changed by tightening and loosening the rope of the first rope coiling apparatus and/or the rope of the second rope coiling apparatus.

10. The working system according to claim 8, wherein a rope direction detection mechanism is further disposed on the node body to detect a swinging direction of a rope between the node body and the rope guide mechanism.

11. The working system according to claim 10, wherein the rope direction detection mechanism comprises a rope linkage rod and an angle sensor, and the angle sensor detects an angle change of the rope linkage rod.

12. The working system according to claim 7, wherein one of the ropes that connect the two or more fastened rope nodes to the mobile rope node is connected to the suspended rope node after passing through the mobile rope node.

13. The working system according to claim 1, wherein the mobile rope node comprises a mobile node adsorption mechanism, and the mobile node adsorption mechanism can apply adsorption force to the building.

14. The working system according to claim 1, wherein the suspended rope node comprises a suspended adsorption mechanism, and the suspended adsorption mechanism is adsorbed on a surface of the building.

15. The working system according to claim 1, wherein the mobile rope node is of an L-shaped structure, is in contact with multiple surfaces of the building, and produces acting force on the multiple surfaces.

16. The working system according to claim 1, wherein the mobile rope node is of a Π-shaped structure, envelopes a wall of the building, is in contact with multiple surfaces of the building, and produces acting force.

17. The working system according to claim 1, wherein a mobile working mechanism is disposed on the working apparatus, the mobile working mechanism enables the working apparatus to move on a surface of a building on which the working apparatus works, and the mobile working mechanism is provided with wheels.

18. The working system according to claim 1, wherein an obstacle-overcoming sled is disposed at ends of the working apparatus, and the obstacle-overcoming sled is provided with an inclined outwardly extending shape or an arc shape.

19. The working system according to claim 1, wherein the suspended rope node comprises two or more working apparatuses, and two adjacent working apparatuses are flexibly connected.

20. The working system according to claim 17, wherein an obstacle-overcoming sled is disposed at ends of the working apparatus, and the obstacle-overcoming sled is provided with an inclined outwardly extending shape or an arc shape.

21. The working system according to claim 17, wherein the suspended rope node comprises two or more working apparatuses, and two adjacent working apparatuses are flexibly connected.

* * * * *